March 9, 1943. S. ESGRO 2,313,424
REGISTERING KEY FOR DISPENSING APPARATUS
Filed Aug. 17, 1939 6 Sheets-Sheet 1

INVENTOR:
SAM ESGRO,
BY Bruce J. Elliott,
ATTORNEY.

March 9, 1943.  S. ESGRO  2,313,424
REGISTERING KEY FOR DISPENSING APPARATUS
Filed Aug. 17, 1939  6 Sheets-Sheet 3

INVENTOR:
SAM ESGRO,
By Bruce S Elliott
ATTORNEY.

March 9, 1943.   S. ESGRO   2,313,424
REGISTERING KEY FOR DISPENSING APPARATUS
Filed Aug. 17, 1939   6 Sheets-Sheet 4

INVENTOR:
SAM ESGRO,
By Bruce S. Elliott
ATTORNEY.

March 9, 1943.  S. ESGRO  2,313,424
REGISTERING KEY FOR DISPENSING APPARATUS
Filed Aug. 17, 1939   6 Sheets-Sheet 5

INVENTOR:
SAM ESGRO,
BY Bruce S. Elliott
ATTORNEY.

March 9, 1943.　　　　S. ESGRO　　　　2,313,424
REGISTERING KEY FOR DISPENSING APPARATUS
Filed Aug. 17, 1939　　　6 Sheets-Sheet 6

INVENTOR:
SAM ESGRO,
By Bruce S. Elliott
ATTORNEY.

Patented Mar. 9, 1943

2,313,424

UNITED STATES PATENT OFFICE 2,313,424

REGISTERING KEY FOR DISPENSING APPARATUS

Sam Esgró, Memphis, Tenn., assignor of forty-nine per cent to Charles Arthur Jean, Mrs. Charles W. Jean, and Ralph Nelson Jean, all of Memphis, Tenn.

Application August 17, 1939, Serial No. 290,579

8 Claims. (Cl. 235—1)

This invention relates to merchandise dispensing systems of the type illustrated in my prior Patent No. 2,127,769, dated August 23, 1938, and while the general objects of the present invention are substantially the same as those set forth in my prior patent, these objects are accomplished by improved mechanism, and in some respects different mechanism from that illustrated in said patent.

Outlining the general objects of the present invention, one of said objects consists in the provision of improved mechanisms whereby a customer is enabled to make a series of purchases and to have the sum of all of his purchases totalized on a registering device, which he has employed in effecting the delivery of the goods purchased, so that the amount of his purchases is not open to question by either the customer or the cashier of the store, and payment can therefore be promptly effected.

Another object of this invention is to provide an improved combined registering and totalizing device which will enable the proprietor of the store, for any given period of time, such as a day, or a week, to determine the total amount of sales effected for that period.

Another object of the invention is to provide novel means for enabling the delivery of a purchase from a cabinet to be readily effected.

Still another object is to provide improved price-setting means on each cabinet, or container, of goods which are designed to cooperate with an improved registering device, or key, carried by the customer whereby the release of the article purchased is readily effected, and the purchase price thereof correctly indicated on the said registering device, or key.

The invention herein presented consists, to a considerable extent, in improvements on the mechanisms for accomplishing similar purposes described and illustrated in my patent aforesaid; and all of the advantages set forth in said patent as derived from the use of the mechanisms thereof, apply equally to the present invention.

The invention is illustrated in the accompanying drawings, in which—

Figures 1, 6, 7:
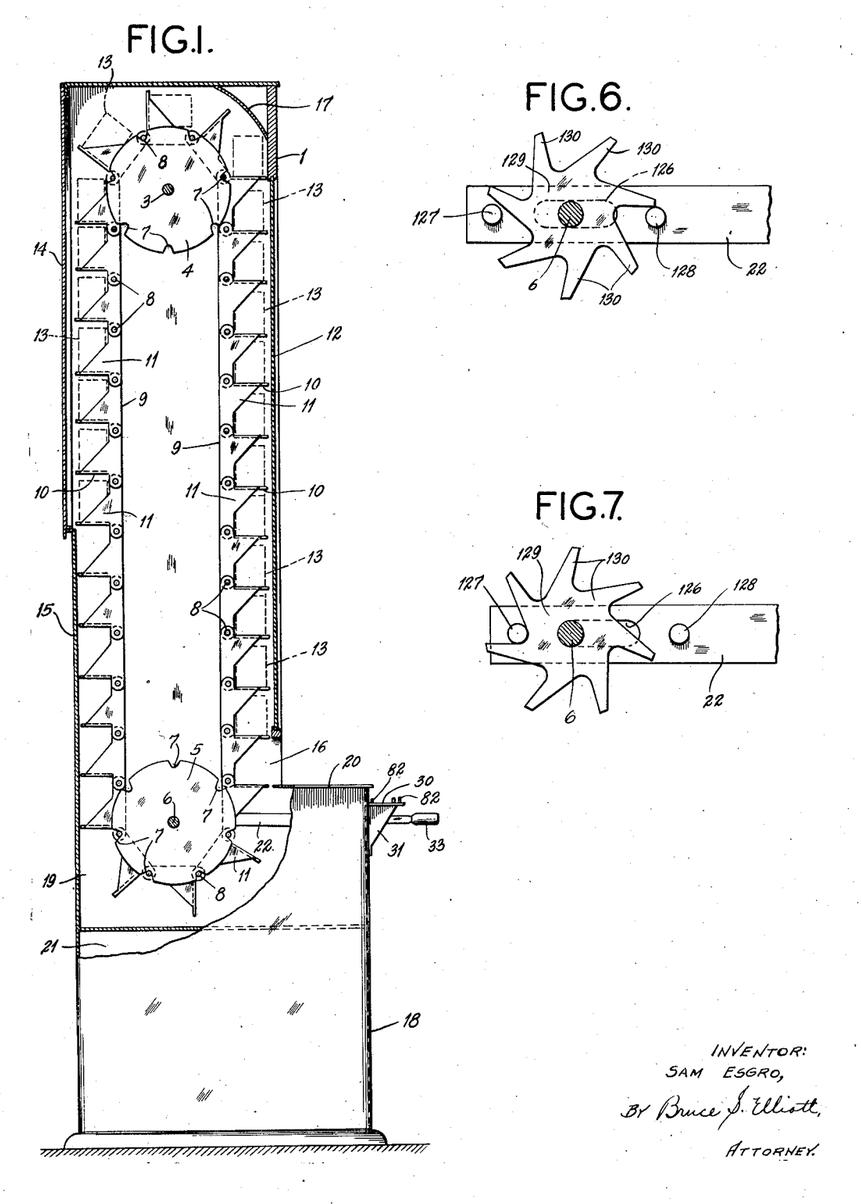
Figure 1 is a side elevation of a single cabinet embodying my invention, a portion of the side wall being broken away to show the delivery chain and sprockets for moving the merchandise from behind the glass display front to the opening in front of the customer.
Figure 6 is a fragmentary view of an operating lever and escapement wheel in a neutral position (see Figures 3 and 4)
Figure 7 is a view similar to Figure 6 showing a moved position of the escapement wheel and lever. This movement is the first half of a downward and then upward travel of a customer's operating handle, the last half, or upward movement, allowing the escapement wheel to again assume the position shown in Figure 6.
Figures 2, 4, 5:
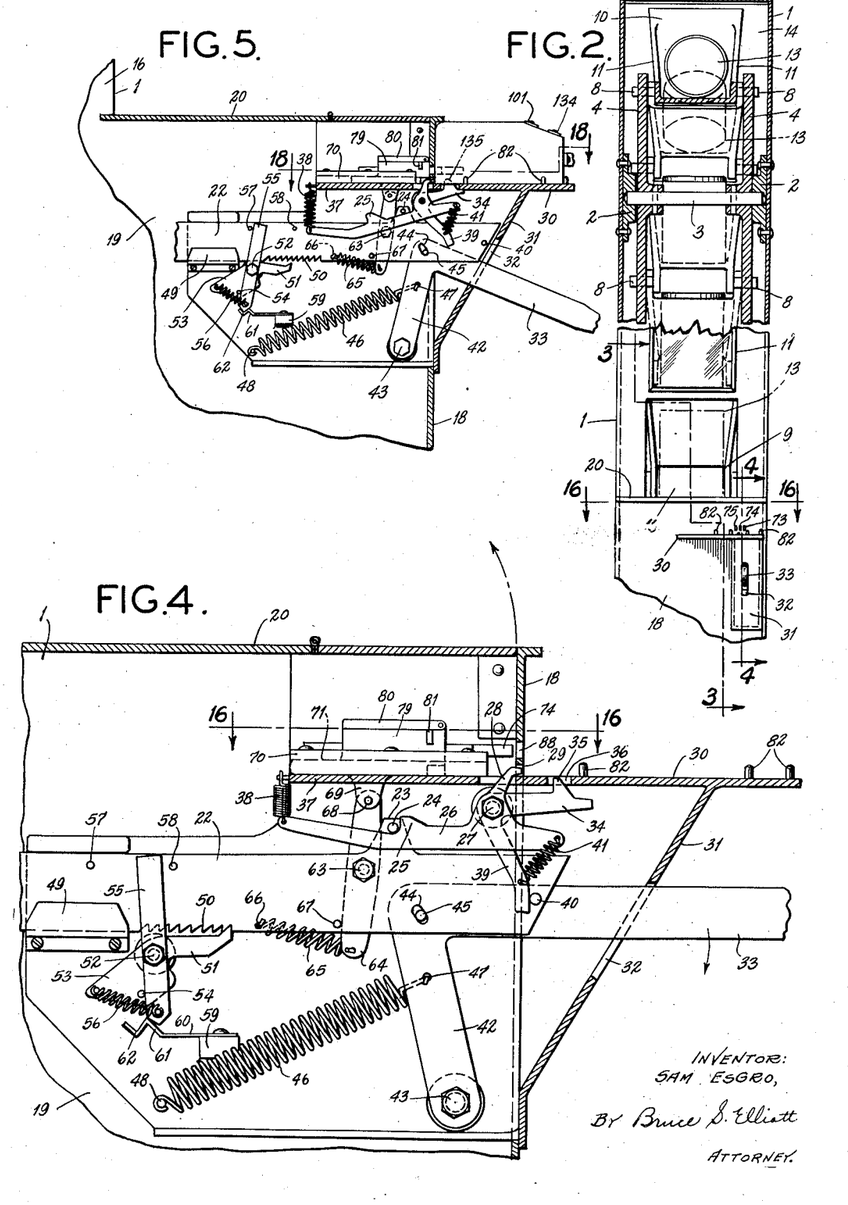
Figure 2 is a front elevation of the cabinet shown in Figure 1, the upper portion being shown in section to illustrate the bearings for the upper sprockets.
Figure 4 is a sectional view on a still further enlarged scale, looking in the same direction as Figure 3, and being taken on the line 4—4 of Figure 2. In this view the parts are shown in a neutral position, that is the position of the parts when no registering device, or key, is being applied. The dotted arrow shows the direction a lid to the mechanism chamber of a cabinet may be raised.
Figure 5 is a similar view to Figure 4, on a reduced scale, showing a register applied to the cabinet and the operating handle moved downwardly so as to cause a movement of the delivery chain and subsequent delivery of a unit of merchandise.

Referring now to the drawings, the numeral 1 Figures 1 and 2 indicates one of a series of cabinets which are arranged in position around the sides of a store, or on sides of aisles, in any desired manner and which are easily accessible for examination and operation by customers entering the store. Each of these cabinets contains articles of merchandise, such as canned goods, bottle goods, package goods, and the like, such as is ordinarily found in grocery stores. These articles of merchandise are so arranged within the cabinet as to be automatically movable to a discharge opening for removal by the customer when he has operated the mechanism of the cabinet in a manner and by means to be later described.

In the present form of the invention I have shown the articles of merchandise as being mounted in compartments provided on an endless conveyor. To this end, there is provided near the top of the cabinet two bearings 2 which rotatably support the ends of a shaft 3 on which are mounted a pair of sprockets 4. A similar pair of sprockets 5 mounted on a shaft 6 are located near the bottom of the cabinet. These sprockets are provided with corresponding and equally spaced peripheral recesses 7 which are adapted to receive the cross pins 8 of an endless sprocket conveyor 9 which is provided with a series of compartments throughout its length, each compartment comprising a shelf 10 provided with sides 11. The front of the cabinet is provided with a glass panel 12 through which the articles of merchandise 13 supported on the shelves 10 can be readily seen. At the rear of the cabinet there is provided a removable panel 14 to enable the compartments to be restocked with the articles of merchandise. It will be noted, and it is a feature of the invention, that this removable panel extends only part way down the rear side of the cabinet starting from the top; and that quite a number of the compartments, six as shown in the drawings, Figure 1, will be rendered inaccessible by a permanently closed portion provided by the lower fixed part of the rear side of the cabinet indicated by the numeral 15. The purpose of this arrangement is to prevent any articles of merchandise being inserted in the compartments until each compartment in turn has risen above the upper end of the fixed back 15. This insures that the greater number of articles of merchandise will always be on the descending, or front side, of the conveyor, so that when the machine is operated by a customer one of the articles of merchandise will descend by gravity to a position opposite a delivery opening 16 located immediately below the lower end of the glass panel 12.

In the use of an endless sprocket conveyor such as described, it is necessary to place the cans, packages, or the like, upside down on the charging or rear side of the conveyor, and as they pass around the upper side of the upper sprockets 4, they will fall from the shelf on which they are supported to the one immediately in advance of it and thus be positioned right side up. In order to prevent too much noise and movement in this change in position of the articles of merchandise, I provide a curved guide 17 which is sufficiently close to the outer edges of the shelves to support and steady the article as it drops from one shelf to the other.

The cabinet is supported on a base 18 providing two compartments. The upper compartment 19 houses the lower sprocket wheels 5, and the mechanism for effecting delivery of the merchandise and provides a shelf 20 for supporting the article as it is removed through the opening 16. The lower compartment 21 may conveniently be used as a storage bin from which, from time to time, articles may be removed to restock the conveyor.

In Figures 3, 4, 5, 6, 7, 16 and 17, I have illustrated the price setting mechanism installed in each cabinet and the combination therewith of the means for controlling the movement of the merchandise conveyor and these mechanisms will now be described, the latter mechanism being described first.

The numeral 22, Figures 4 and 5, indicates a slide bar having on its upper side a projecting lug 23 provided with a pin 24 which normally engages behind a shoulder 25 on a bar 26 pivoted toward its forward end at 27 within the base of the cabinet and provided with an upwardly extending trigger 28 which lies opposite an opening 29 in the front wall of the base, the bottom of said opening being flush with the upper side of a flat support 30, Figures 1, 4 and 5 constituting part of a bracket mounted on the front side of the base, the other member of which is in the form of a supporting plate 31 mounted at its lower end on the front wall of the base and provided with a slot 32 through which projects an operating handle 33. Mounted on the pivot pin 27 is a bell crank lever 34 having on one arm an upward projection constituting a locking detent 35, the upper end of which normally lies within an opening 36 in the flat support 30 but below the surface of said support. The support 30 may conveniently be extended within the upper compartment 19 of the base, as shown more clearly in Figures 4 and 5, to serve as a support for the price fixing mechanism and which support is separately indicated by the numeral 37. The rear end of the locking bar 26 has secured to it one end of a coil spring 38, the upper end of which is secured to the support 37. The other arm of the bell crank lever 34, previously referred to, and indicated at 39, extends downward a considerable distance below the upper side of the slide bar 22, and its lower end lies immediately behind a pin 40 mounted on the forward end of said slide bar. The bell crank lever is normally held in the position shown in Figure 4 by said pin 40 against the tension of a coil spring 41, one end of which is secured to the arm 39, and the other end to the forward end of the locking bar 26.

The mechanism which has been described including the locking bar 26 with its trigger 28 and the bell crank lever 34 with its locking detent 35, is for the purpose of preventing the operation of the handle 33 to release merchandise until the registering device has been properly associated with the price fixing mechanism of the cabinet, and when this occurs, the mechanism will be actuated in a manner to be described to permit the operation of the handle.

The handle 33 is in the form of a crank arm, one member of which constitutes the handle proper to be manipulated by the customer and the other member of which, indicated at 42 is pivotally mounted at 43 within the cabinet. At its elbow the crank handle 33—42 is provided with a slot 44 which receives a pin 45 mounted on the side of the slide bar 22. A coil spring 46, connected at one end at 47 to the crank arm 42 and at its other end at 48. to the wall of the cabinet normally holds the crank handle 33 in the position shown in Figure 4.

When the handle 33 is manipulated to release an article of merchandise, as will be later described, the slide bar 22 will be moved forward to the position indicated in Figure 5 by engagement of the slot 44 with the pin 45 on said bar, this movement of the slide bar operating to move the price fixing mechanism slidably mounted in the space above the support 37. In order to prevent the return of the slide bar until it has been moved the entire distance from the position shown in Figure 4 to that shown in Figure 5, I provide ratchet and pawl mechanism which will now be described.

The rear portion of the slide bar 22 is supported in a guide 49, and just beyond this guide the under side of the guide bar is provided with a line of ratchet teeth 50 which are engaged by a pawl 51 which is pivotally mounted at 52. Projecting rearwardly and downwardly from the pawl beyond its pivot is a flat extension 53, having projecting from one side a pin 54. Pivotally mounted on the pivot 52 intermediate its ends is an arm 55, the lower end of which has secured to it one end of a coil spring 56, the other end of which is connected to the rear end of the extension 53 of the pawl. The rear side of the lower end of arm 55 is normally engaged by the pin 54 on the pawl extension. The upper end of said arm lies between two pins, 57 and 58, secured on the side of slide bar 22. Secured on a block 59 is one end of a spring bar 60, the outer end of which is bent upon itself to provide an angular engaging surface 61 and a V-shaped recess 62. The lower end of arm 55 is V-shaped, as shown, so that one side is normally engaged by the angular member 61 of the spring arm to hold it in the position shown in Figure 4. When the slide bar 22 has been moved outward to the position shown in Figure 5, the pin 57 on the slide bar will engage the rear side of the upper end of the arm moving its lower end over the angular surface 61 of the spring bar and permitting the recess 62 to spring into engagement with its lower end, while at the same time the pin 54 on the pawl extension will be engaged by the arm to move the extension rearwardly and upwardly and release pawl 51 from engagement with the teeth 50, the pawl being held in this position, as shown in Figure 5, by reason of the engagement of the recess 62 with the lower end of said arm. The slide bar 22 may now be moved rearwardly, but can not be so moved until the pawl mechanism has been locked in the position described and shown in Figure 5.

Pivotally mounted intermediate its ends on the slide bar 22 as indicated at 63, is a lever 64, the lower end of which has secured to it one end of a coil spring 65, the other end of which is secured to the slide bar 22 rearwardly of the pivot 63, as indicated at 66. The rear side of the lower end of lever 64 is engaged by a pin 67 mounted on the side of slide bar 22. The function of the lever 64 is to move the price fixing mechanism, and to this end its upper end is pivotally connected at 68 to an ear 69 projecting downward from the bottom of the price fixing means, which will now be described.

Figure 16:
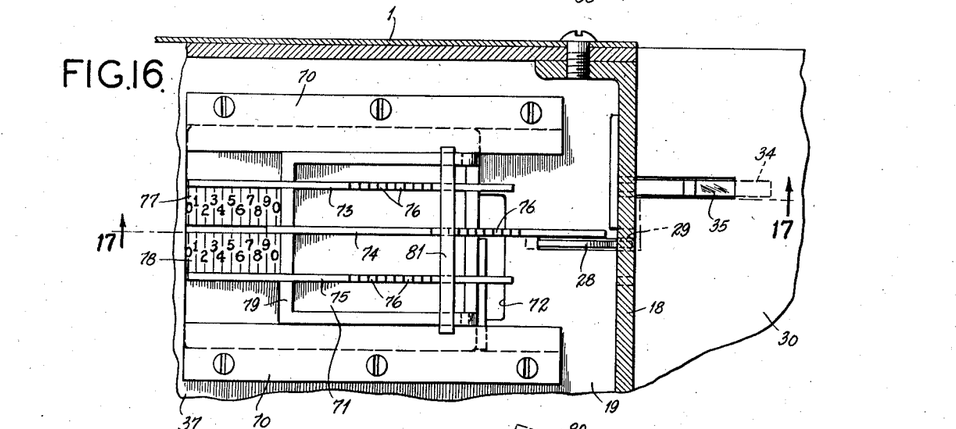
Figure 16 is a fragmentary horizontal, or plan section, of a corner of the cabinet taken on the line 16—16 of Figure 2, showing means for setting and holding the price of the merchandise in that cabinet.
Figure 17:
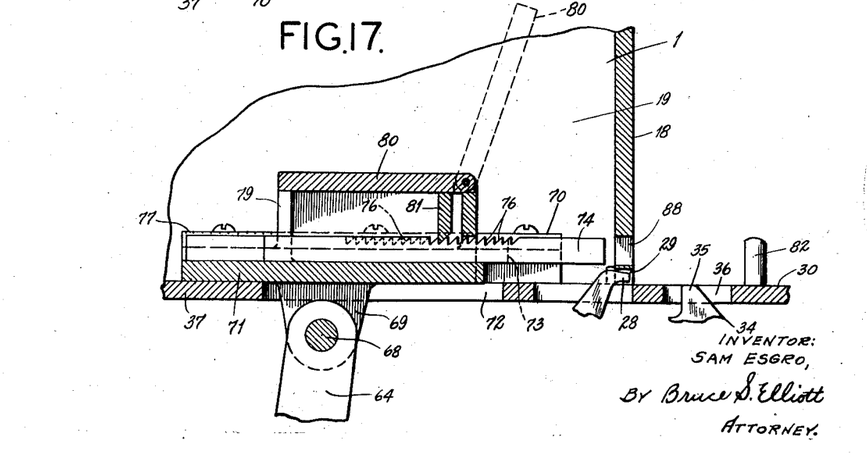
Figure 17 is a longitudinal section of the price fixing means taken on line 17—17 of Figure 16.
Figure 18:
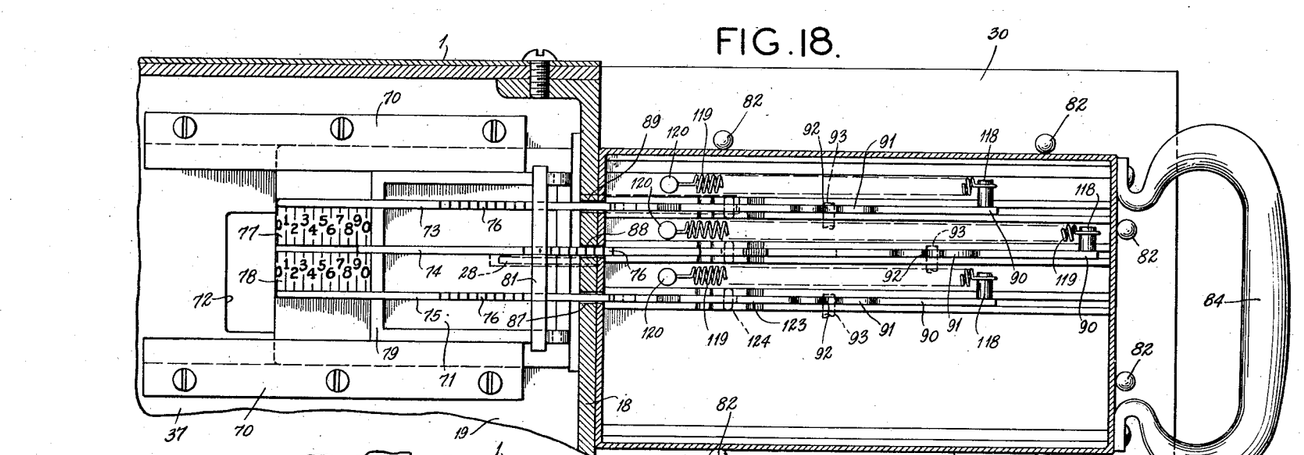
Figure 18 is a plan section similar to Figure 16 with the register shown in place and the price fixing means moved into engagement with the register as when a customer is holding down the operating handle. This view is a combination of Figures 16 and 11, and the parts are in a position corresponding to the condition represented in Figures 5, 7 and 14.

Referring particularly to Figures 16, 17 and 18 the numerals 70 indicate two guides mounted on the support 37, in and between which is mounted the base 71 of the price fixing mechanism from which the ear 69 depends, as heretofore stated. This ear works in a slot 72 provided in the support 37. Slidably and adjustably mounted, in parallel relation, in the base 71 are three price fixing bars 73, 74 and 75, respectively, each of which is provided on its upper side with ratchet teeth 76. These bars are located on opposite sides of and between, respectively, two price scales 77, 78, respectively, which contain digits running in order from 0 to 9 plus 0, as clearly shown in Figures 16 and 18. These price scales enable the price fixing bars to be adjusted to indicate any price from 1 cent up to $9.99, it being assumed that the latter amount is sufficient to cover the cost of any article, or two or more articles sold as a unit, that would be purchased at one time. In setting the price fixing bars, if the price requires the use of only one digit, the tens bar 74 is moved outwardly to bring its rear end opposite the number indicating the price of the article in the cabinet, which in Figures 16 and 17 is represented as ninety cents, the rear end of bar 74 lying opposite the graduation on the price scale indicating the number. If the price of the merchandise were ten cents, the bar 74 would have its rear end moved opposite the graduation indicating the number 1 and the bar 73 would have its rear end moved opposite the graduation indicating 0 at the beginning of its scale; and so with any price up to ninety-nine cents. Should the price of the article be more than ninety-nine cents, say, for example, $1.25, the bar 73 would have its rear end moved opposite the digit 5, the central bar 74 would have its rear end moved opposite the digit 2 and the bar 75 would have its rear end moved opposite the digit 1. Mounted on the upper side of the base 71 is a box-like compartment 79 having a hinged lid 80. This sliding box has three slots cut into its front and rear walls in which are placed the three price fixing bars above referred to. Mounted in slots formed in the side walls of box 79 is a pointed cross bar 81. The lid 80 of box 79 is adapted to be raised to permit the price fixing bars to be adjusted to indicate the price per unit of merchandise in that particular cabinet whereupon the cross bar 81 is placed across the price fixing bars and by contact with the ratchet teeth holds the bars locked in their adjusted position. After locking the bars as described, the lid 80 would be closed and itself locked, to prevent any unauthorized change in the position of the price fixing bars. The price fixing bars are adapted to operate the mechanism of the portable combined item register and totalizer carried by the customer when said device is placed in position on the flat support 30, and this device, which, for the sake of brevity, will hereinafter be referred to as a register, will now be described referring particularly to Figures 8, 9, 10, 11, 12, 13, 14, 15 and 18.

As shown more particularly in Figure 18, the support 30 is provided with six positioning pins 82 projecting upwardly therefrom, and in order for the register 83 to properly function with the price fixing mechanism, it must be positioned within these pins, as clearly indicated in Figure 18. The register 83 is provided at one end with a handle 84 by means of which it is carried by the customer and projecting from its forward end near its bottom, is a fixed pin 85, which when the register is placed in position on the support 30 will be caused to extend into the opening 29, engage the trigger 28, Figures 4 and 17 and move the locking bar 26 downward to release engagement of its shoulder 25 with the pin 24 on slide bar 22, or from the position shown in Figure 4 to that shown in Figure 5. Provided in the bottom of the register near its forward end is a recess 86, shown in dotted lines in Figures 13, 14 and 15, and when the register is correctly positioned on the support 30 will lie immediately over the opening 36 in said support. The customer having so positioned the register, and the slide bar 22 being free to move, as above explained, moves the handle 33 downward, or from the position shown in Figure 4 to that shown in Figure 5. In this movement of the handle, the engagement of its recess 44 with the pin 45 on slide bar 22 operates to move this slide bar 22 forward, or to the position shown in Figure 5. In this movement of the slide bar the pin 40 will be carried out of contact with the arm 39 of bell crank lever 34, and spring 41 will now act to raise the arm 39 of said lever and force the locking detent 35 into engagement with the recess 86 in the bottom of the register. This operates to lock the register on the support 30 and prevent its removal until the handle 33 has been returned to its normal position, or to that shown in Figure 4. Thus, the ratchet and pawl mechanism 50 and 51 requires that the slide bar 22 be moved the entire distance forward before it can be returned to the starting position, and the locking detent 35 prevents the removal of the register until the slide bar 22 has been moved the entire distance from its forward position shown in Figure 5 to its normal position shown in Figure 4. When this latter movement has been completed, the pin 40 will have engaged arm 39 to place spring 41 under tension, and to lower detent 35 from engagement with the recess 86. This permits the register to be removed. Also, pin 24 will have been moved rearwardly beyond shoulder 25 and spring 38 immediately acts to lift bar 26 to the locking position shown in Figure 4 and to return trigger 28 to its position in opening 29.

Figure 8:
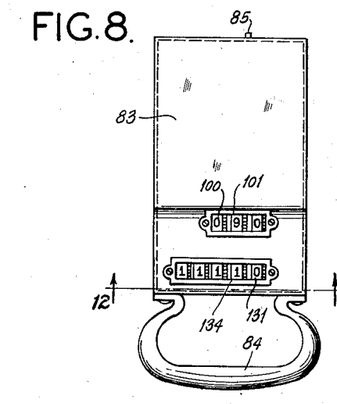
Figure 8 is a top plan view of a registering device, or key, which is carried by the customer and utilized by him in effecting the delivery of purchased articles.
Figure 9:
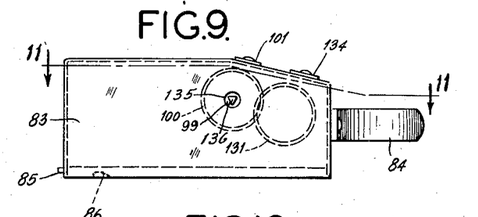
Figure 9 is a side view of the registering device, or key.
Figure 10:
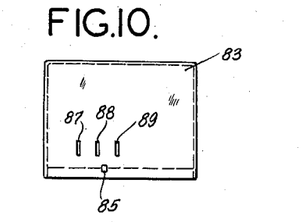
Figure 10 is an end view of said registering device, or key.
Figure 11:
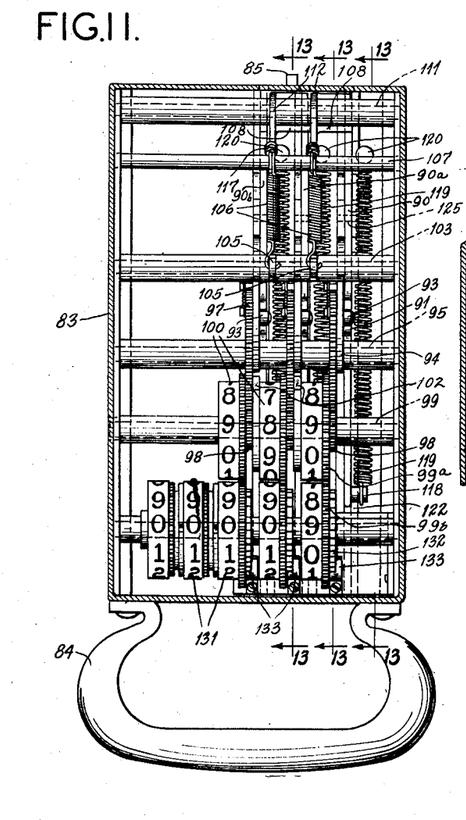
Figure 11 is a horizontal section of a registering device, on an enlarged scale taken on the line 11—11 of Figure 9.
Figure 12:
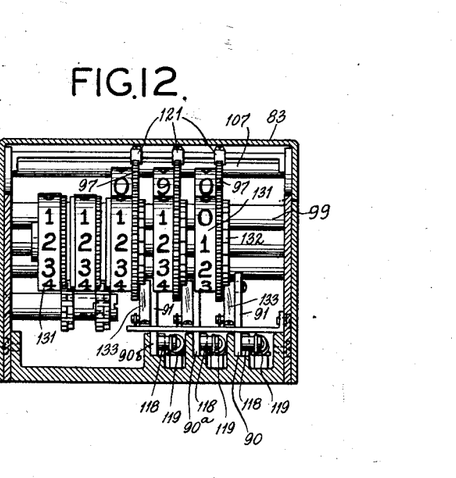
Figure 12 is a vertical section of a registering device, on an enlarged scale taken on the line 12—12 of Figure 8.
Figure 13:
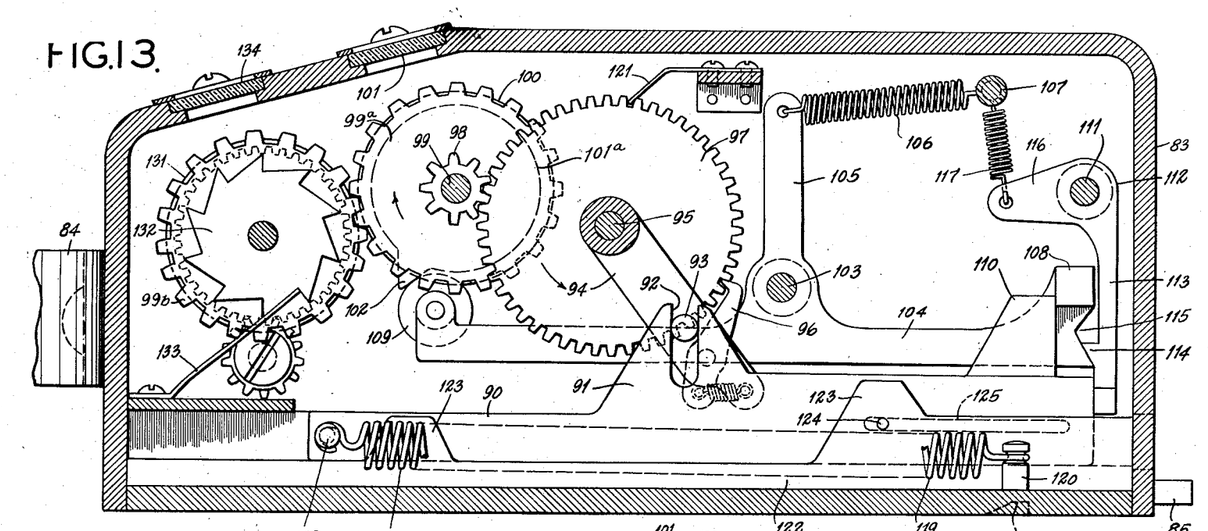
Figure 13 is a longitudinal section of a registering device on a greatly enlarged scale taken on the line 13—13 of Figure 11. This view is a typical section of any one of the three orders of the registering mechanisms in the machine taken on any one of the three lines 13—13, 13—13, 13—13, indicated on Figure 11.

Referring to Figure 10, it will be seen that the forward end of the register is provided with three openings 87, 88, 89, respectively, which, when the register is properly positioned on support 30 will be directly opposite, or in line with, the forward ends of the three price fixing bars 73, 74 and 75. As shown by Figure 16, only the central price fixing bar 74 has been adjusted to indicate a price, which, as has been stated, is ninety cents. In other words, the bar 74, as will later appear, operates the tens wheel of the register and the bar 73 the units wheel. As this latter bar is at zero when the register is operated, as later explained, the customer's number wheels will show a price of ninety cents. When the register has been placed in position on support 30, and the handle 33 moved downward, the box 79 having the price fixing bars fixedly secured in position therein by the cross bar 81, will be yieldingly moved forward, or to the right, in Figures 4, 5 and 17, by means of the lever 64. In this movement the price fixing bar 74 will enter the central opening 88 in the forward end of the register and engage a slide bar 90 in the register for operating the registering mechanism. This slide bar has an upward projecting member 91 on its upper side provided with a vertical slot 92, which engages a pin 93 on a lever 94 pivoted on a main cross shaft 95. The lever 94 carries a pawl 96 which engages the teeth of a large gear 97. This gear meshes with a small spur gear 98 on the customer's number wheel shaft 99 which spur gear is fixed to a gear 99$^a$ in mesh with a gear 99$^b$ for operating a numbers wheel of totalizing mechanism. As the slide bar 90$^a$ is moved back, by engagement therewith of the price fixing bar 74, the pawl 96 will ride over a certain number of teeth of the gear 97. When the handle 33 is released by the operator and returned to its normal upward position by spring 46, the price fixing bar 74 will be moved out of engagement with the slide bar 90$^a$ and its spring 119 will draw said slide bar 90$^a$ forward, or to the right in Fig. 13, in which movement the pawl 96 will cause the gear 97 to be rotated, thereby rotating spur gear 98 and the tens number wheel 100 a distance corresponding to that of the adjustment of the price fixing bar. In the present case, as only the price fixing bar 74 is used, the central number wheel 100 will be turned to indicate 9, as indicated in Figures 8, 11 and 12, and hence the register indicates a purchase of ninety cents, the number nine being on the tens number wheel, and the zero on the units wheel. The customer's registering wheels can be observed through a glass panel 101 covering an opening in the upper side of the case of the register. In order to carry over from the units wheel to the tens wheel, I provide the following mechanism:

Fixedly secured on the units wheel of the customer's register is a disk 101$^a$ having a peripheral pointed cam 102. Pivotally mounted on a cross shaft 103 is a lever 104 having an upright arm 105, to the upper end of which is secured one end of a coil spring 106, the other end being secured to a fixed part 107 in the register casing. There is a lever 104 with its stop 108 positioned to cooperate with each of the slide bars 90$^a$ and 90$^b$ operating the tens and hundreds wheels, respectively, but no lever and stop are associated with slide bar 90 operating the units wheel, as there is no carry over to this wheel. The outer, or forward end of lever 104 has projecting from one side a stop 108. The inner end of lever 104 has mounted thereon a roller 109 which is normally held upward in engagement with the cam 102 by the tension of spring 106. The slide bar 90$^a$ for operating the tens number wheel 100 is provided near its forward end with an upward projection 110, which normally rests in front of stop 108, as shown by Fig 13. Pivotally mounted on a cross shaft 111 at the forward end of the register is a bell crank lever 112 having a vertically depending arm 113 having near its lower end a shoulder 114, which normally rests in a recess 115 in the end of lever 104. The other arm 116 of bell crank lever 112 has secured to its outer end the lower end of a coil spring 117, the upper end of which is secured to the fixed member 107.

Figure 14:
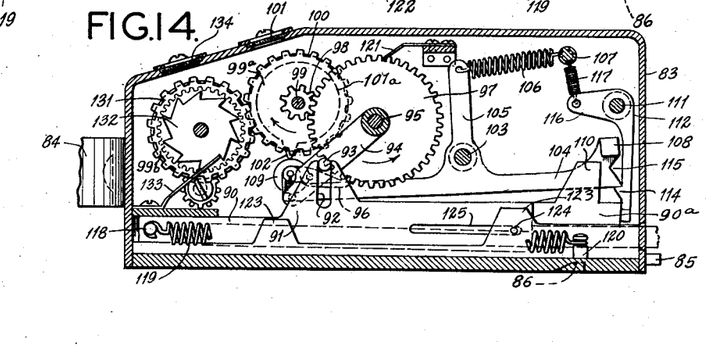
Figure 14 is a view similar to Figure 13, on a reduced scale showing the mechanism of the register moved to midway position corresponding as to the position of parts to the condition represented in Figures 5 and 7, that is, after the customer's handle has been pushed downward and held.
Figure 15:
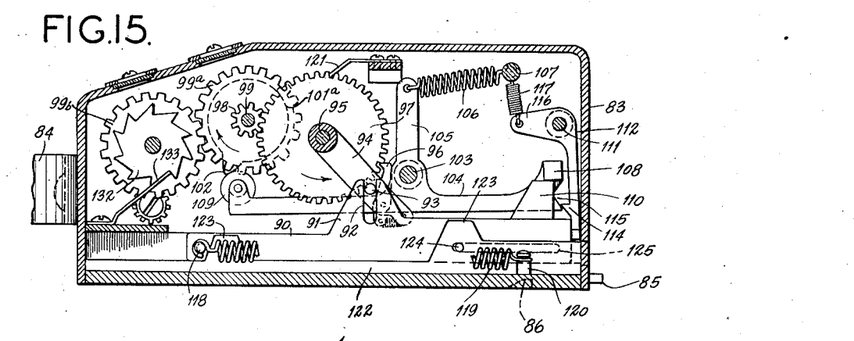
Figure 15 is a view similar to Figures 13 and 14, showing the return of the mechanism in the register as the result of the customer moving the operating lever upwardly.

If the units number wheel is given a complete turn, the pointed cam 102 of the units wheel will depress roller 109 causing the forward end of lever 104 to be raised, until it catches on the shoulder 114 of arm 113 which springs under the end of the lever under the tension of coil spring 117. This position is shown in Fig. 14. In this position of the lever, the stop 108 is carried above the plane of projection 110 on the slide bar 90ª. The purpose of this is to permit the slide bar 90ª to move the tens wheel an additional distance so that there will be a carry over from the units to the tens wheel. This will occur in a manner now to be described.

Secured at 118 to the inner end of slide bar 90 is a relatively long coil spring 119, the opposite end of which is secured to a post 120 located near the forward end of the register, as shown by Figure 13. When the slide bar 90 operating the units wheel is pushed inward by engagement with its forward end of the price fixing bar, 73, the lever 94 will be moved to the left, in Figure 13, the pawl 96 slides over the teeth of the large gear 97 which is prevented from movement by a spring catch 121, the end of which engages between the teeth of said gear. When the handle 33 is raised by the customer the slide box 80 is moved by lever 64 to the left in Figure 4, removing the price fixing bar from engagement with the end of slide bar 90. The latter is now free to be moved forwardly, or to the right, or from the position shown in Figure 14 to that shown in Figure 15, under the pull of the coil spring 119. In this movement lever 94 will be turned to the right and its pawl 96 will engage a tooth of gear 97 and cause the same to be rotated in an anti-clock direction, turning the spur gear 98 which in turn will rotate the units wheel 100. Assuming the units and tens wheels to indicate 4 and 5, or 54 cents, and the price fixing bars 73 and 74 set to indicate a price of 27 cents, when the register mechanism is now operated in connection with this setting, the units wheel will be turned past 0 to indicate 1, and in this movement the cam 102 will engage roller 109 and lower the rear end of lever 104 to carry the stop 108 above the projection 110, or to the position shown in Fig. 14. It will now be seen that with the roller 109 lowered to a position beneath the pointed end of cam 102, slide bar 90ª can be moved by its spring the additional distance necessary to cause an added movement of the tens wheel and thus effect a carry over to the tens wheel. The result will be that the tens wheel will be moved to indicate 7, and the result of adding the 27 cents to the 54 cents already indicated will be that the units wheel will indicate 1, and the tens wheel will indicate 8, showing the correct sum of adding 27 to 54 will be 81. In the same way a carry over may be effected from the tens wheel to the hundreds wheel, as all three orders of the registering mechanisms are the same as illustrated in Figure 13 with the exception, as previously explained, that no carry over lever 104 is associated with slide bar 90.

When the slide bar 90ª has been moved to the right a sufficient distance to effect the carry over described, its forward end will engage the lower end of arm 113 and move its shoulder 114 out of engagement with the end of lever 104, which it has been holding up. This will permit lever 104 to fall to the position shown in Figure 15 in which the stop 108 will rest upon the top of projection 110. The next movement of the slide bar is effected by engagement therewith of its price fixing bar when the register is again placed in position for use, which will move it back the distance it advanced to effect the carry over and will permit the lever 104 to drop from the position shown in Figure 15 to that shown in Figure 13, which is its normal position.

The slide bar 90 is located adjacent to a guide bar 122, which is provided with guide lugs 123, and is guided and controlled in its back and forth movement by means of a pin 124 on the front end of the guide bar working in a groove, or slot 125 in the slide bar. I will now describe the operation of effecting the delivery of an article of merchandise by manipulating the handle 33 in a manner described.

Figure 3:
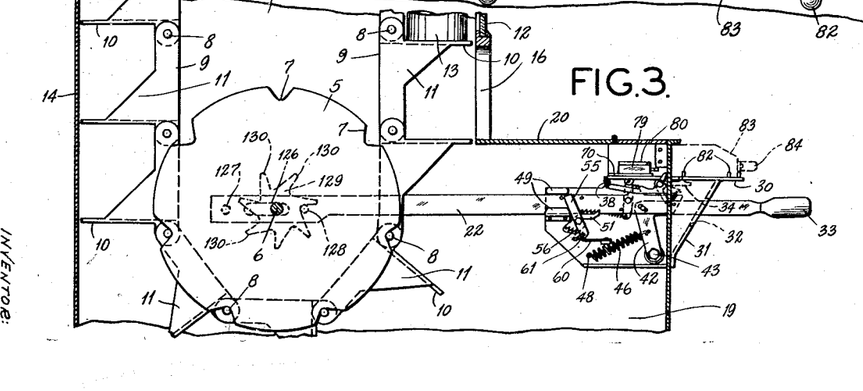
Figure 3 is a sectional view on an enlarged scale, looking from the same side as Figure 1, and taken on the line 3—3 of Figure 2, illustrating the shaft and the escapement drive for the lower sprocket of the delivery chain, a cooperating registering device being shown in dotted lines.

Referring particularly to Figure 3, it will be seen that the slide bar 22 is extended rearwardly to a point beyond the shaft 6 and is provided with a longitudinal slot 126 which works over the shaft 6 and is supported thereby. Located at equal distances from opposite ends of the slot 126 are two pins 127 and 128, Figures 6 and 7, which project from one side of the slide bar 22. Secured on the shaft 6 is an escapement wheel 129, having widely spaced inclined teeth 130, the distance from one tooth to the next representing the distance from one recess 7 to the other on the sprockets 4 and 5. With a slide bar 22 in the position shown in Figure 3, that is before the handle 33 has been moved downwardly, the pin 128 will be engaged by one of the teeth of the ratchet wheel, while the pin 127 will occupy a position beyond the teeth of the sprocket wheel. When the handle 33 is moved downwardly the pin 128 will be moved free from engagement with the tooth of the ratchet wheel, while the pin 127 will be moved in the recess between two teeth as shown in Figure 7. When the handle bar is next moved upwardly, the pin 127 is moved to the position shown in Figure 6, while one of the teeth 130 will be moved into engagement with the pin 128. This movement of the ratchet wheel is effected by gravity, due to the preponderance of weight of merchandise on the front side of the endless conveyor 9. As stated, the distance the ratchet wheel moves before one of its teeth engages the pin 128 is the distance required for one of the compartments of the conveyor to move to a position opposite the delivery opening 16. The customer then removes the article, and likewise removes the register from the support 30. If he wishes another article from this particular cabinet, he would repeat the foregoing operation.

Referring to Figures 11, 12, 13 and 14, it will be seen that the customer's number wheel gears 99ª mesh with the gears 99ᵇ of the number wheels 131 of the proprietor's registering mechanism which is located at the extreme front end of the register casing. Each of these gears of the number wheels is provided with a ratchet 132 which is engaged by the free end of a spring latch 133, to prevent backward movement of said wheels. The proprietor's registering mechanism, or totalizer, may be seen through a glass panel 134 covering an opening provided in the top of the register.

When the customer enters the store and receives a register in order that he may make his purchases, the number wheels of the customer's indicator will all be at zero. As he makes his various purchases the same will be totaled up to $9.99 which, as stated, is assumed to be the extreme amount purchased by any one customer at one visit. This amount will also be registered on the proprietor's number wheels. When he goes to the cashier, he pays the amount registered and the proprietor then returns the customer's number wheels to show three zeros. For this purpose the proprietor inserts a key through an opening 135, Fig. 9, in the side wall of the casing of the register and engages the key with an arbor 136 provided on the end of shaft 99. The number wheels 100 are mounted on the shaft 99 so as to be turned independently of the gears 99ª, as is usual in registers, thus permitting the number wheels to be turned to zero without operating the proprietor's wheels. The proprietor's number wheels however, are not reset, but continue to register and totalize purchases made by this particular register until $1000.00, when the number wheels are automatically reset to show zeros. Thus, assuming thirty customers use one particular register during a day, and assuming further that each purchased $5.00 worth of goods, then the proprietor's number wheels would show a total of $150.00 at the close of that business day. If this register shows $150.00 on Monday evening and $220.00 on Tuesday evening, the proprietor knows that $70.00 worth of merchandise was sold on Tuesday to customers using this particular register.

As shown by Figures 11 and 12 the various number wheels have the usual operating gears, and gear connections between the customer's number wheels, and the proprietor's number wheels, or totalizer. It is not considered necessary, however, to describe the registering mechanism in detail so far as the number wheels and carry over mechanisms are concerned as such mechanisms are entirely conventional and characteristic of registering devices generally.

I claim:

1. Merchandise dispensing apparatus comprising, in combination, a cabinet, having a delivery opening, delivery apparatus mounted therein having compartments for unitary articles of merchandise, means, including an operating handle, mounted on said cabinet for effecting movement of said delivery apparatus in stages, each stage of movement presenting an article opposite said delivery opening, locking mechanism mounted in said cabinet normally preventing actuation of said handle and having a trigger lying in an opening in the front wall of said cabinet, a customer's register which, in operating the apparatus, is positioned on said cabinet adjacent said opening and having a pin on its forward end which, when the register is so positioned engages said trigger and releases the locking mechanism, operating means for the register mechanism, price fixing bars operatively connected with said handle and movable in the actuation of said handle to actuate said operating means to cause the registering mechanism to register the amount of the article delivered and then to be carried out of relation to the register, and automatic means for restoring the locking mechanism to normal position after a delivery operation of the handle and removal of the register by the customer.

2. Merchandise dispensing apparatus comprising, in combination, a cabinet having a delivery opening, delivery apparatus mounted in the cabinet having compartments for unitary articles of merchandise, means, including an operating handle, mounted on said cabinet for effecting movement of said delivery apparatus in stages, each stage of movement presenting an article at said delivery opening, locking mechanism normally preventing actuation of said handle, a customer's register which, in operating said apparatus, is positioned on said cabinet in proximity to said locking mechanism and having means when so positioned to release said locking mechanism, said register having number wheels and slide members for actuating the same and provided in its end wall with openings opposite the ends of said slide members, a slide box mounted in said cabinet and operatively connected with said handle and having adjustable price fixing bars fixed in position therein and projecting forwardly of the box according to the extent of their adjustment to indicate various prices, a series of openings provided in said cabinet opposite the ends of said price fixing bars and aligning with the openings in said register when the latter is positioned on the cabinet, said slide box being adapted to be moved in the actuation of said handle to cause said price fixing bars to enter the register and operate the slide members thereof to cause said number wheels to register the amount of the article delivered and then to be moved by said slide box out of relation with the register, and automatic means for restoring the locking mechanism to normal position after a delivery operation of the handle and removal of the register by the customer.

3. Merchandise dispensing apparatus comprising, in combination, a cabinet, delivery apparatus mounted therein having compartments for unitary articles of merchandise, a slide bar for effecting movement of said delivery apparatus in stages, each stage of movement presenting an article at a delivery opening in the wall of the cabinet, an operating handle operatively connected with said slide bar for moving the same first in a forward direction and then in the reverse direction, locking mechanism normally preventing actuation of said handle, a customer's register which, in operating said apparatus, is positioned on said cabinet in proximity to said locking mechanism and having means when so positioned to release said locking mechanism, operating means for the register mechanism, said register having a locking recess in its bottom, a support on the cabinet for said register having an opening, a bell crank lever, one arm of which is provided with a locking detent positioned in said opening, a spring tending normally to move said detent upward in said opening, a pin on the slide bar normally preventing the rise of said detent in said opening, whereby when said slide bar is moved in the forward direction the pin thereon will be moved out of engagement with the arm of the bell crank lever and the said spring will force the locking detent into engagement with the recess in the bottom of the register and lock the register against removal from the cabinet until said slide bar has been moved in a rearward direction to cause its pin to again engage the arm of said bell crank lever and lower said detent out of engagement with the locking recess of the register, price fixing members operatively connected with said handle and movable in the actuation of said handle to actuate said operating means to cause the register mechanism to register the cost of the article delivered and then to be carried out of relation to the register, and automatic means for restoring the locking mechanism to normal position after a delivery operation of the handle and removal of the register by the customer.

4. Merchandise dispensing apparatus comprising, in combination, a cabinet, delivery apparatus mounted therein having compartments for unitary articles of merchandise, a slide bar for effecting movement of said delivery apparatus in stages, an operating handle operatively connected with said slide bar for moving the same first in a forward direction and then in a rearward direction, locking mechanism normally preventing actuation of said handle, a customer's register which, in operating said apparatus, is positioned on said cabinet and having means when so positioned to release said locking mechanism, operating means for the register mechanism, a slidable carriage mounted in the cabinet, means settable according to the cost of the article delivered comprising a plurality of adjustable price fixing bars mounted in said carriage and each of which is provided with teeth on its upper side, a cross bar mounted in said carriage and having an edge adapted to engage the teeth of said bars and hold them in their adjusted positions, means actuated by said slide bar and adapted to move said carriage first in a forward direction to cause said price fixing bars to actuate said operating means to cause the register mechanism to register the cost of the article delivered and then to move said bars out of relation to the register, and automatic means for restoring the locking mechanism to normal position after a delivery operation of the handle and removal of the register by the customer.

5. Merchandise dispensing apparatus comprising, in combination, a cabinet, delivery apparatus mounted therein having compartments for unitary articles of merchandise, means including an operating handle mounted on said cabinet and movable in a downward and then an upward direction for effecting movement of said delivery apparatus in stages, a customer's register which, in operating said apparatus, is positioned on said cabinet and having openings in its end wall aligning with openings in the wall of the cabinet, number wheels mounted in said register, a spring controlled slide member operatively connected with each number wheel for rotating the same, a plurality of adjustable price fixing bars mounted in said cabinet and operatively connected with said handle and adapted in the downward movement of said handle to be projected through said openings into said register and move said slide members against the resistance of their springs and to be moved back into said cabinet in the upward movement of the handle to permit the springs of said slide members to return them to their former position and in such movements to operate said number wheels whereby to register the amount of the article delivered.

6. Merchandise dispensing apparatus comprising, in combination, a cabinet, delivery apparatus mounted therein having compartments for unitary articles of merchandise, means, including an operating handle, mounted on said cabinet for effecting movement of said delivery apparatus in stages, locking mechanism normally preventing actuation of said handle, a customer's register which, in operating the apparatus, is positioned on said cabinet in proximity to said locking mechanism, and having means when so positioned to release said locking mechanism, operating means for the register mechanism, price fixing members operatively connected with said handle and movable in the actuation of the handle to actuate said operating means to cause the register mechanism to register the amount of the article delivered and then to be carried out of relation to the register, and automatic means for restoring the locking mechanism to normal position after a delivery operation of the handle and removal of the register by the customer.

7. Merchandise dispensing apparatus comprising, in combination, a cabinet, delivery apparatus mounted therein having compartments for unitary articles of merchandise, means, including an operating handle, mounted on said cabinet for effecting movement of said delivery apparatus in stages, each stage of movement presenting an article for delivery, locking mechanism normally preventing movement of said handle, a customer's register which, in operating the apparatus, is positioned on said cabinet in proximity to said locking mechanism, and having means when so positioned to release said locking mechanism, operating means for the register mechanism, means operating in the movement of said handle to lock said register on the cabinet, price fixing bars operatively connected with said handle and movable in the actuation of said handle to actuate said operating means to cause the register mechanism to register the amount of the article delivered and then to be carried out of relation to the register, and automatic means for releasing said register and for restoring the locking mechanism to normal position after a delivery operation of the handle and removal of the released register.

8. Merchandise dispensing apparatus comprising, in combination, a cabinet, delivery apparatus mounted therein and having compartments for unitary articles of merchandise, means mounted on the cabinet for effecting movement of the delivery apparatus in stages, including an operating handle adapted to be moved by the customer first in a downward and then in an upward direction, each stage of movement of the delivery apparatus presenting an article for removal by the customer, locking mechanism normally preventing actuation of said handle, a customer's register which, in operating the apparatus, is positioned on the cabinet in proximity to said locking mechanism, and having means when so positioned to release said locking mechanism, operating means for the register mechanism, price fixing bars operatively connected with said handle and movable as a unit in the downward movement of said handle to actuate said operating means, to cause the register mechanism to register the amount of the article delivered and to be carried out of relation to the register in the upward movement of said handle, automatic means for restoring the locking mechanism to normal position after a delivery operation of the handle and removal of the register by the customer, and means for preventing an upward movement of the handle until it has been moved the full distance required for the downward movement.

SAM ESGRO.